United States Patent
Huhn et al.

[11] 3,846,407
[45] Nov. 5, 1974

[54] PENICILLIN DERIVATIVES CONTAINING A HALOGENO-CARBONYL GROUP

[75] Inventors: Magda Huhn; Géza Toth; Gábor Resofszki; Éva Somfai; Gábor Horváth, all of Budapest, Hungary

[73] Assignee: CHINOIN Gyógyszer- és Vegyészeti Termékek Gyára Rt., Budapest, Hungary

[22] Filed: July 1, 1971

[21] Appl. No.: 159,041

[30] Foreign Application Priority Data
July 3, 1970   Hungary.............................. CI-1006

[52] U.S. Cl................................ 260/239.1, 424/271
[51] Int. Cl.............................................. C07d 99/16
[58] Field of Search................................ 260/239.1

[56] References Cited
UNITED STATES PATENTS
3,478,018   11/1969   Robinson et al................. 260/239.1
3,595,855   7/1971   Robinson......................... 260/239.1

FOREIGN PATENTS OR APPLICATIONS
959,853   6/1964   Great Britain................... 260/239.1

*Primary Examiner*—Nicholas S. Rizzo
*Attorney, Agent, or Firm*—Karl F. Ross; Herbert Dubno

[57] ABSTRACT

Process for the preparation of new penicillin-derivatives of the formula I,

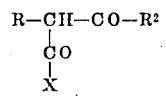

(wherein R stands for an optically substituted aromatic, heterocyclic, aliphatic or alicyclic group; X stands for halogen and $R^2$ stands for a radical containing the 6-amino-penicillanic acid group) which comprises reacting an acid halide of the formula II

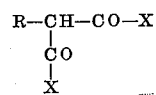

(wherein R and X have the same meaning as stated above) with a 6-amino penicillanic acid derivative of the formula III

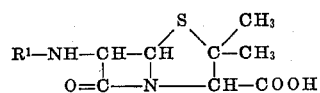

wherein $R^1$ stands for hydrogen or a group containing a primary amino group) or a salt or ester thereof in anhydrous medium in the presence of a weak base.

6 Claims, No Drawings

PENICILLIN DERIVATIVES CONTAINING A HALOGENO-CARBONYL GROUP

The importance of semi-synthetic penicillins has been constantly increasing in the last decades, since the development of resistant micro-organisms required the preparation of novel derivatives. A new group of this type of compounds contains free or substituted carboxylic acid groups in the radical, which acylates the 6-amino-penicillanic acid.

The aim of the present invention is to extend the group of said compounds to novel reactive penicillin derivatives, which may be prepared with good yields in pure form and due to their increased reactivity enable the preparation of a wide range of further new compounds.

According to the present invention, there is provided a process for the preparation of new penicillin derivatives of the formula I,

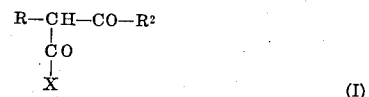
(I)

which comprises reacting an acid halide of the formula II

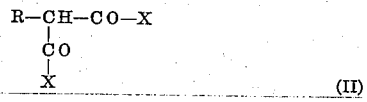
(II)

with a 6-amino-penicillanic acid derivative of the formula III

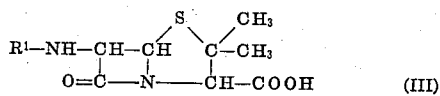
(III)

or a salt or ester thereof in an anhydrous medium in the presence of a weak base, (in which formulae
R stands for an optionally substituted aromatic, heterocyclic, aliphatic or alicyclic group;
$R^1$ stands for hydrogen or a group containing a primary amino group;
X stands for halogen; and
$R^2$ stands for a group containing the 6-amino-penicillanic acid group).

The present invention is based on the recognition that dicarboxylic acid halides of the formula II are capable of acylating selectively the amino group of 6-amino-penicillanic acid in anhydrous medium in the presence of weak base, while the other carboxylic acid halide group remains unchanged. It has been recognized further that under suitable mild conditions the compounds thus obtained may be easily introduced into further reactions without decomposition. Due to their extremely high reactivity, the compounds are difficult to isolated and, therefore they may be purified and used in the form of suitable solutions.

According to a preferred embodiment of the process of the present invention, dicarboxylic acid halides of the formula II are reacted with compounds of the formula IV,

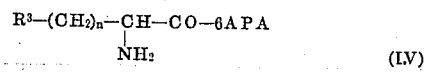
(IV)

(wherein $R^3$ stands for an optionally substituted aromatic, heterocyclic, aliphatic or alicyclic group).

The starting materials of the formula III may be used in the form of their salts formed with basic compounds.

The sodium and potassium salts may be preferably used. It is, however, more advantageous to use salts formed with organic bases (e.g. trimethylamine, triethylamine, N-alkyl-piperidine, morpholine) which are more readily soluble in the reaction medium.

The compounds of the formula III may also be used in the form of a sylyl ester thereof. The trimethyl-sylyl-esters can be used with greatest success. The compounds of the formula III may also be used as other esters.

The reaction may be carried out preferably at a temperature between −30° and −20° C.

The process of the present invention is particularly suitable for the preparation of compounds of the formula V,

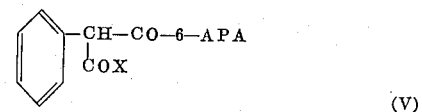
(V)

(wherein X stands for halogen) by reacting a phenyl-malonyl-dihalide with 6-amino-penicillanic acid or a salt or ester thereof in an anhydrous medium in the presence of a weak base.

If a dicarboxylic acid dihalide of the formula II, (wherein R and X have the same meaning as stated above) is reacted with a compound of the formula VII,

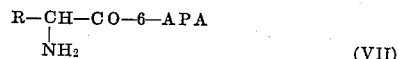
(VII)

(wherein R has the same meaning as stated above and 6-APA means 6-amino-penicillanic acid) new compounds of the formula VI

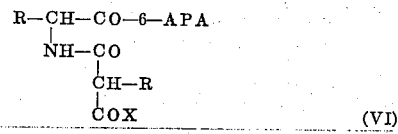
(VI)

are obtained, (wherein R and X have the same meaning as stated above).

Formulae (V) and (VI) correspond to the generic formula

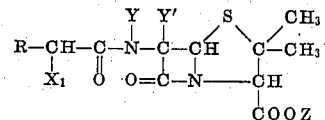

where R is phenyl or bromo or chlorophenyl, $X_1$ is

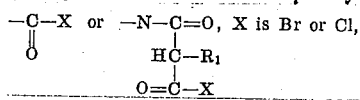

and $R_1$ is phenyl or bromo or chlorphenyl, Y is hydrogen or trialkylsilane wherein the alkyl group is methyl, and Z is hydrogen and the compound is an acid or a trialkylamine salt thereof, or Z is trialkylsilane in which the alkyl group is methyl.

According to a preferred embodiment of the present invention a phenyl-malonyl-dihalide is reacted with α-amino-benzyl-penicillin or a salt or ester thereof.

In the new compounds of the present invention X may stand in the first place for chlorine or bromine. Other halogens may be used, but in special cases.

When carrying out the process of the present invention, it is essential to use anhydrous medium. The reaction may be carried out preferably in a hydroxy-free solvent or diluent (e.g. methylene chloride, chloroform, carbon tetrachloride, acetonitrile, dichloroethane).

The base used by the process may be preferably a weak base, such as N,N'-dimethylaniline, pyridine, N-ethyl-morpholine, etc.

It is to be emphasized that the reaction mixture should be anhydrous during the handling thereof, since the presence of water would lead to the hydrolysis of the acid halide and the loss of the chemical activity of the compound.

The active acid chlorides according to the present invention are new, never described in the literature. The patent protects also said new compounds and the use thereof.

Thus according to the present invention there are provided new compounds of the formulae I, V, VI and VIII,

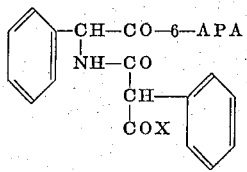

(VIII)

(wherein R, $R^1$, $R^2$, $R^3$ and X have the same meaning as stated above and 6-APA stands for the acid radical of 6-amino-penicillanic acid).

In the compounds R may stand preferably for an optionally substituted aromatic group. The substituents may be selected from the group containing of alkyl, alkoxy, halogen, amino and nitro. When R stands for an optionally substituted heterocyclic radical, it represents preferably a five- or six-membered monocyclic, heterocyclic radical, containing at least one oxygen, sulphur and/or nitrogen heteroatom. Particularly preferable heterocyclic groups are the thiazolyl, pyrazolyl and furyl group. The heterocyclic group may be optionally substituted by one or more substituents. Preferred substituents are the halogen atoms, alkoxy and aryloxy groups.

R may also stand for an optionally substituted aliphatic group. Said groups may be saturated or unsaturated and straight or branched chained. Preferred aliphatic groups are the alkyl and alkenyl groups. The aliphatic groups may bear one or more substituents. As preferred substituents the halogen atoms, amino, alkoxy and aryloxy groups may be mentioned.

When R stands for an alicyclic group, it represents preferably a five- or six-membered, optionally substituted ring-system. The substituents may be preferably halogen atom, amino, alkoxy or aryloxy groups.

In the formula III $R^1$ stands for hydrogen or a group containing a primary amino group. The latter group may be attached to the 6-amino-penicillanic acid radical through an alkyl chain, a peptide bond or an aromatic or heterocyclic group. The process of the present invention may be used in every case when the primary amino group is present in the molecule under suitable conditions for the acylating carboxylic acid halide.

Particularly valuable end-products are obtained when using starting materials, in which R stands for a phenyl group, which may be substituted by halogen, alkoxy, amino and/or aryloxy.

Further details of our invention are to be found in the Examples without limiting the scope of the claims to the Examples.

EXAMPLE 1

6.5 g (0.03 mole) of 6-amino-penicillanic acid are suspended in 70 ml of methylene chloride, whereupon after addition of 8.4 ml (0.06 mole) of triethylamine the reaction mixture is stirred at room temperature until a clear solution is obtained. The solution is cooled to 0° C and a solution of 3.5 g (0.03 mole) of pyridine-hydrochloride, 2.5 ml of pyridine and 30 ml of methylene chloride is added dropwise. The reaction mixture is cooled to −30° C, whereupon a solution of 6.5 g (0.03 mole) of phenyl-malonyl-dichloride and 50 ml of methylene chloride is added. The reaction mixture is stirred at a temperature between −30° and −20° C for an hour. At the beginning of this period the solution has an intensive orange color and later it becomes a paint yellow color. The reaction of phenyl-malonyl-dichloride may be followed by means of infrared spectrum and potentiometric titration of the reaction mixture. Thus about 12 g of the trimethylamine salt of α-(chloro-carbonyl)-benzyl-penicillin are obtained. The product is suitable for further reaction. Yield 75 percent.

EXAMPLE 2

6.5 g (0.03 mole) of 6-amino-penicillanic acid are suspended in 70 ml of methylene chloride, whereupon 84 ml (0.06 mole) of triethylamine are added and the reaction mixture is stirred at room temperature until a clear solution of 4.5 g (0.03 mole) of N,N-dimethylaniline-hydrochloride, 3 g (0.03 mole) of N,N-dimethylaniline and 50 ml of dichloromethane is added. The reaction mixture is cooled to −30° C and at this temperature a solution of 6.5 g (0.03 mole) of phenyl-malonyl-dichloride and 50 ml of methylene chloride is added. The reaction mixture is worked up as described in Example 1. Thus 10 g of the triethylamine salt of α-(chloro-carbonyl)-benzyl-penicillin are obtained.

EXAMPLE 3

6.5 g (0.03 mole) of 6-amino-penicillanic acid are reacted with 8.4 ml (0.06 mole) of triethylamine in 70 ml of methylene chloride. To the solution of the salt thus obtained 6.5 g (0.06 mole) of trimethyl-chloro-silane are added. To the solution of the corresponding tri-methyl-silyl-ester thus obtained 4.02 g (0.03 mole) of N,N-dimethylaniline and 30 ml of methylene chloride is added at 0° C. The mixture is cooled to −30° C and a solution of 6.5 g (0.03 mole) of phenyl-malonyl-dichloride and 50 ml of methylene chloride is added. Then one proceeds as described in Example 1. Thus α-(chloro-carbonyl)-benzyl-(6-N-trimethyl-silyl)-penicillin-(trimethyl-silyl)-ester is obtained with a yield of 70–77 percent.

EXAMPLE 4

7 g (0.02 mole) of α-amino-benzyl-penicillin are suspended in 70 ml of methylene chloride, whereupon 5.6 g (0.04 mole) of triethylamine are added and the reaction mixture is stirred at room temperature until a clear solution is obtained. The reaction mixture is cooled to 0° C, whereafter a solution of 2.4 g (0.02 mole) of pyridine-hydrochloride, 1.8 ml (0.02 mole) of pyridine and 20 ml of methylene chloride is added. The reaction mixture is cooled to −20° C and a solution of 4.5 g (0.02 mole) of phenyl-malonyl-dichloride and 40 ml of methylene chloride is poured in. Then one proceeds as described in Example 1. According to the determinations described in Example 1, the triethylamine salt of α-(α'-[chloro-carbonyl]-α'-[phenyl]-acetamido)-benzyl-penicillin is obtained in a yield of 45-55 percent.

EXAMPLE 5

7 g (0.02 mole) of α-amino-benzyl-penecillin are suspended in 70 ml of methylene chloride. 5.6 ml (0.04 mole) of triethylamine are added and the mixture is stirred at room temperature until a clear solution is obtained. At 0° C a solution of 2.8 g (0.02 mole) of N,N-dimethylaniline-hydrochloride, 2.2 g (0.02 mole) of N,N-dimethylaniline and 20 ml of methylene chloride is added. After cooling to −20° C a solution of 4.5 g (0.02 mole) of phenyl-malonyl-dichloride and 40 ml methylene chloride is added. Further one proceeds as described in Example 2. Thus the salt of α-(α'-[chloro-carbonyl]-α'[phenyl]-acetamido)-benzyl-penicillin is obtained.

EXAMPLE 6

7 g (0.02 mole) of α-amino-benzyl-penicillin are suspended in 70 ml of methylene chloride. The corresponding salt is formed with 5.6 ml (0.04 mole) of triethylamine and the product is converted into the corresponding trimethyl-silyl-ester with the aid of 4.5 g (0.04 mole) of trimethyl-chlorosylane. To the solution 2.5 g (0.02 mole) of N,N-dimethylaniline dissolved in 20 ml of methylene chloride are added, the mixture is cooled to −20° C and at this temperature a solution of 4.5 g (0.02 mole) of phenyl-malonyl-dichloride and 40 ml of methylene chloride is poured in. Next one proceeds as described in Example 3. According to determinations the α-(α'-[chlorocarbonyl]-α'-[phenyl]-N-[trimethylsilyl]-acetamido benzyl penicillin trimethyl-silane-ester is obtained with a yield of 60-70 percent.

EXAMPLE 7

4.5 g (0.02 mole) of 6-amino-penicillanic acid are suspended in 50 ml of methylene chloride, whereupon after addition of 5.6 ml (0.04 mole) of trimethylamine the reaction mixture is stirred at room temperature until a clear solution is obtained. The mixture is cooled to 0° C, whereupon a solution of 2.3 g (0.02 mole) of pyridine-hydrochloride, 1.6 ml of pyridine and 20 ml of methylene chloride is added. The reaction mixture is cooled to −30° C and at this temperature a solution of 5.0 g (0.02 mole) of p-chlorophenyl-malonyl-dichloride and 50 ml of methylene chloride is added. Next one proceeds as described in Example 1. The triethylamine salt of α-(chloro-carbonyl)-p-chlorobenzyl-penicillin is obtained in a yield of 70-75 percent.

EXAMPLE 8

4.5 g (0.02 mole) of 6-amino-penicillanic acid are suspended in 50 ml of methylene chloride and a salt is formed with 5.6 ml (0.04 mole) of triethylamine in the usual way. The mixture is cooled to 0° C, whereupon a solution of 2.4 g (0.02 mole) of pyridine-hydrochloride, 1.6 ml of pyridine and 20 ml of methylene chloride is added. The reaction mixture is cooled to −30° C and at this temperature a solution of 5.0 g (0.02 mole) of o-chloro-phenyl-malonyl-dichloride and 50 ml of methylene chloride is added. Thereafter one proceeds as described in Example 1. Thus the triethylamine salt of α-[chloro-carbonyl]-o-chlorobenzyl-penicillin is obtained in a yield of 68-72 percent.

EXAMPLE 9

7 g (0.02 mole) of α-amino-benzyl-penicilin are suspended in 70 ml of methylene chloride. Salt formation is carried out by using 5.6 ml of triethylamine as described in the previous Example. The mixture is cooled to 0° C, whereupon a solution of 2.5 g (0.02 moles) of pyridine hydrochloride, 1.6 ml of pyridine and 20 ml of methylene chloride is added, the mixture is cooled to −30° C and at this temperature a solution of 5 g (0.02 mole) of p-chlorophenyl-malonyl-dichloride and 50 ml of methylene chloride is added. Further one proceeds as described in Example 1. Thus the triethylamine salt of α-(α'-[chloro-carbonyl]-α'-[chloro-phenyl]-acetamido-benzyl-penicillin is obtained in a yield of 70-74 percent.

EXAMPLE 10

From 7 g (0.02 mole) of α-amino-benzyl-penicillin and 5.6 ml of triethylamine salt is formed as described in the previous Example. After cooling to 0° C a solution of 2.4 g (0.02 mole) of pyridine-hydrochloride, 1.6 ml (0.02 mole) of pyridine and 20 ml of methylene chloride is added, whereupon the mixture is cooled to −30° C and a solution of 5.0 g (0.02 mole) of o-chloro-phenyl-malonyl-dichloride and 50 ml of methylene chloride is poured in. Furtheron one proceeds as described in Example 1. Thus the triethylamine salt of α-(α'-[chloro-carbonyl]-α'-[o-chloro-phenyl] acetamido-benzyl-penicillin is obtained.

In the preceding examples, referring to formula (VI'), R is phenyl in Examples 1, 2, 3, 4, 5, 6, 9 and 10; R is halophenyl in Examples 7 and 8; $X_1$ is chlorocarbonyl in Examples 1, 2, 3, 7 and 8; $X_1$ is acetamido substituted at the α' site with halocarbonyl and phenyl in Examples 4 and 5 and substituted at the α' site with halophenyl in Examples 9 and 10; Y is hydrogen in Examples 1, 2, 4, 5, 6, 7, 8, 9 and 10, but is trialkysilane in Example 3; Z is trialkylsilane in Examples 3 and 6 and otherwise is hydrogen whereby the compound may be in the form of triethylamne salt.

What we claim is:

1. A penicillin derivative having the formula:

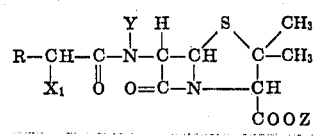

where R is phenyl, bromophenyl or chlorophenyl; $X_1$ is

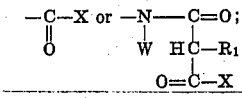

$R_1$ is phenyl, bromphenyl or chlorophenyl;
X is bromine or chlorine; and W, Y, and Z are the same or different and are hydrogen or trimethylsilane, or the trimethylamine, triethylamine, N-alkylpiperidine or morpholine salt thereof.

2. A penicillin derivative as defined in claim 1 and selected from the group consisting of α-(chlorocarbonyl)-benzyl-penicillin; α-(α'-[chlorocarbonyl]-α'-[phenyl]-acetamido)-benzyl-penicillin; α-(chlorocarbonyl)-p-chlorobenzyl-penicillin; α-(chlorocarbonyl)-o- chlorobenzyl-penicillin; α-(α'[chlorocrabonyl]-α'[p-chlorobenzyl])-acetamido-benzyl-penicillin; α-(α'-(chlorocarbonyl)-α'-(chlorocarbonyl)-α'-[o-chlorophenyl])-acetamido-benzyl-penicillin and the trimethylamine, triethylamine, N-alkylpiperidine and morpholine salt and the trimethylsilane and thereof.

3. A compound of the formula

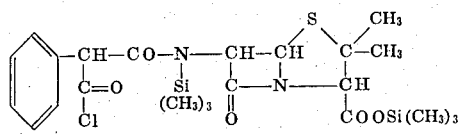

4. A compound of the formula

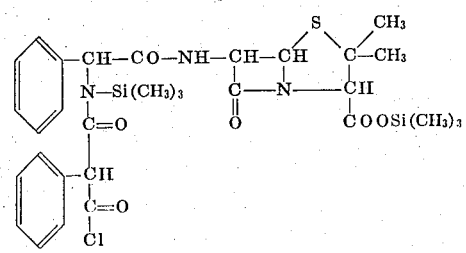

5. α-(chlorocarbonyl)-benzyl-(6-N-trimethylsilyl)penicillin-(trimethyl-silyl)-ester.

6. α-(α'-[chlorocarbonyl])α'-[phenyl]-N-[trimethylsilyl]-acetamido-benzyl-penicillin-(trimethylsilyl)-ester.

* * * * *